(12) United States Patent
Selle et al.

(10) Patent No.: US 10,913,816 B2
(45) Date of Patent: Feb. 9, 2021

(54) ONE-COMPONENT FENESTRATION FOAM FORMULATION DEMONSTRATING LOW INITIAL SHRINKAGE

(71) Applicant: DDP SPECIALTY ELECTRONIC MATERIALS US, LLC, Wilmington, DE (US)

(72) Inventors: Beverly J. Selle, Lake Jackson, TX (US); Deborah A. Schutter, Minooka, IL (US); Megan Thomas, Midland, MI (US); Stéphane Costeux, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 15/750,541

(22) PCT Filed: Sep. 20, 2016

(86) PCT No.: PCT/US2016/052563
§ 371 (c)(1),
(2) Date: Feb. 6, 2018

(87) PCT Pub. No.: WO2017/058559
PCT Pub. Date: Apr. 6, 2017

(65) Prior Publication Data
US 2018/0237574 A1 Aug. 23, 2018

Related U.S. Application Data

(60) Provisional application No. 62/234,722, filed on Sep. 30, 2015.

(51) Int. Cl.
| | | |
|---|---|---|
| *C08G 18/12* | (2006.01) | |
| *C08G 18/20* | (2006.01) | |
| *C08G 18/30* | (2006.01) | |
| *C08G 18/32* | (2006.01) | |
| *C08G 18/48* | (2006.01) | |
| *C08G 18/66* | (2006.01) | |
| *C08G 18/76* | (2006.01) | |
| *C08G 101/00* | (2006.01) | |

(52) U.S. Cl.
CPC ......... *C08G 18/12* (2013.01); *C08G 18/2081* (2013.01); *C08G 18/307* (2013.01); *C08G 18/3206* (2013.01); *C08G 18/4812* (2013.01); *C08G 18/4825* (2013.01); *C08G 18/4829* (2013.01); *C08G 18/6674* (2013.01); *C08G 18/7664* (2013.01); *C08G 2101/00* (2013.01)

(58) Field of Classification Search
CPC ...... C08G 18/10; C08G 18/12; C08G 18/307; C08G 18/4812
See application file for complete search history.

(56) References Cited

U.S. PATENT DOCUMENTS

| | | |
|---|---|---|
| 5,696,221 A | 12/1997 | Barksby et al. |
| 6,103,850 A | 8/2000 | Reichel et al. |
| 6,410,609 B1 | 6/2002 | Taylor et al. |
| 6,894,083 B2 | 5/2005 | Braun et al. |
| 2004/0024077 A1 | 2/2004 | Braun et al. |
| 2006/0148921 A1 | 7/2006 | Stanjek et al. |
| 2007/0054972 A1 | 3/2007 | Braun et al. |
| 2007/0128367 A1* | 6/2007 | Tabakovic ............. C08G 18/10 427/373 |
| 2008/0269367 A1 | 10/2008 | Neill et al. |
| 2011/0201705 A1 | 8/2011 | Okumura |
| 2015/0197596 A1 | 7/2015 | Dwornicki et al. |

FOREIGN PATENT DOCUMENTS

| | | |
|---|---|---|
| JP | 2004506076 A | 2/2004 |
| JP | 2012224753 | 11/2012 |
| JP | 05549945 | 7/2014 |

\* cited by examiner

*Primary Examiner* — Melissa A Rioja

(57) ABSTRACT

A one-component foam formulation contains a pre-polymer and a blowing agent, the pre-polymer being the reaction product of a polymeric polyol component having an average hydroxyl functionality in a range of 2.3 to 2.85 hydroxyl functionalities per molecule as determined using ASTM D4274-11 (method D); and where the polymeric polyol component has an effective average molecular weight in a range of 4500 and 10000 grams per mole, one or more than one type of chain extender molecule having 3 to 6 carbon atoms and 2 to 4 reactive functionalities selected from a group consisting of hydroxyl and amine functionalities per molecule, a polyisocyanate having a functionality in a range of 2.1 to 3.0 —NCO functionalities per molecule as determined by ASTM D7252-06(2011)e1; and a catalyst.

11 Claims, No Drawings

ONE-COMPONENT FENESTRATION FOAM FORMULATION DEMONSTRATING LOW INITIAL SHRINKAGE

BACKGROUND OF THE INVENTION

Field of the Invention

This invention relates to one-component polyurethane foam.

Introduction

One-component polyurethane foam sealants ("one-component foam" or "OCF") are formulations that comprise a prepolymer of polyol and isocyanate in combination with a blowing agent and typically a catalyst. OCFs are characterized by being a single formulation containing a pre-polymer of polyisocyanate and polyol that exists in a non-foamed state and that can be dispensed from a pressurized vessel and as the blowing agent expands the formulation, the pre-polymer reacts with moisture in the air to form polymeric foam. OCF formulations are distinct from two-component foam formulations. Two-component foam formulations comprise two separate reactants, an "A-side" and a "B-side" that are kept apart until application of the formulation. Upon application, the A-side and B-side are mixed and react as they foam to form polymeric foam. The A-Side comprises a polyisocyanate and the B-Side comprises a polyol. Hence, OCF formulations comprise a prepolymer of polyisocyanates and polyols prior to application while two-component foam formulations maintain the polyisocyanate and polyol components separate until application.

OCF formulations are useful in building construction as sealants. One particularly desirable application for OCF formulations is as an air sealant around fenestration openings, such as window and door openings. One challenge with OCF formulations as fenestration opening sealants is a need to avoid excessive expansion pressure when the OCF formulation foams to fill gaps around the fenestration opening. Typical application locations for OCF formulations are around window frames and door jambs. If the OCF formulation expands with too much pressure the foam can displace the window frame and/or door jamb thereby causing the window or door to no longer fit properly in its opening. Various developments in OCF formulations have focused on modifying the foaming pressure for fenestration applications to avoid this problem.

Another challenge with OCF formulations for fenestration opening sealant applications is to avoid initial shrinkage of the foam between the time the foam is applied and the time it is cured. A consequence of reducing the foaming pressure can be shrinkage of foam generated by the OCF formulation after application and before cure (that is, within 24 hours of application). Such shrinkage can undesirably cause the sealant foam to delaminate from one or more surfaces to which it is applied so as to create a break in the air seal the foam is intended to create. To be of most practical interest, sealant foam should experience little to no shrinkage over a broad range of both temperature (for example, 23 degrees Celsius to 40 degrees Celsius, preferably ten degrees Celsius to 40 degrees Celsius) and relative humidity (30% or more, preferably 20% or more and at the same time 60% or less, preferably 80% or less and more preferably 100% or less), which encompasses typical environmental conditions encountered during end use application.

It is desirable to identify an OCF formulation that generates low enough foaming pressure so as to be a suitable sealant for fenestration openings (generally less than 2.0 kilopascals of pressure during foaming) and that experiences little to no shrinkage (that is, retains at least 97%, preferably at least 98% of its original surface area) within 24 hours of application over a broad range of both temperature (for example, 23 degrees Celsius to 40 degrees Celsius, preferably ten degrees Celsius to 40 degrees Celsius) and relative humidity (30% or more, preferably 20% or more and at the same time 60% or less, preferably 80% or less and more preferably 100% or less).

BRIEF SUMMARY OF THE INVENTION

The present invention provides an OCF formulation that generates low enough foaming pressure so as to be a suitable sealant for fenestration openings (generally less than 2.0 kilopascals of pressure during foaming) and that experiences little to no shrinkage (that is, retains at least 97%, preferably at least 98% of its original surface area) within 24 hours of application over a broad range of both temperature (23 degrees Celsius to 40 degrees Celsius, preferably ten degrees Celsius to 40 degrees Celsius) and relative humidity (30% or more, preferably 20% or more and at the same time 60% or less, preferably 80% or less and more preferably 100% or less).

The present invention is a result of discovering a surprisingly effective balance of polyol functionality and molecular weight in combination with chain extender monomer size and concentration so as to achieve expansion without excessive pressure while avoiding short term shrinkage of the foam after application and before cure.

In a first aspect, the present invention is a one-component foam formulation comprising a pre-polymer, a blowing agent and, optionally, additional additives wherein the pre-polymer is a reaction product of pre-polymer reactants comprising: (a) a polymeric polyol component that comprises a blend of diols and triols, the polymeric polyol component having an average hydroxyl functionality in a range of 2.3 to 2.85 hydroxyl functionalities per molecule as determined using ASTM D4274-11 (method D); and where the polymeric polyol component has an effective average molecular weight $\overline{M}$ in a range of 4,500 to 10,000 grams per mole as calculated according to equation (2):

$$\overline{M} = \Sigma_{i=1}^{n} w_i M_i / \Sigma_{i=1}^{n} w_i \qquad (2)$$

(b) one or more than one type of chain extender molecule having 3 to 6 carbon atoms and 2 to 4 reactive functionalities selected from a group consisting of hydroxyl and amine functionalities per molecule; (c) a polyisocyanate with a functionality in a range of 2.1 to 3.0 —NCO functionalities per molecule as determined by ASTM D7252-06(2011)e1; and (d) a catalyst; where the one-component foam formulation is free of toluene diisocyanate and reaction products of toluene diisocyanate and wherein the polymeric polyol component (a) provides 40-85 mole-percent of the reactive functionalities relative to total hydroxyl and amine functionalities provided by the polymeric polyol component (a) and the chain extender molecule (b) and wherein the polyisocyanate is present at a concentration relative to polyol and chain extender molecule such that there is an average of 12-20 weight-percent unreacted —NCO functional groups based on the total weight of isocyanate and polyol in the formulation as determined by ASTM D2572-97(2010).

The present invention is ideally suited for use as a sealant around fenestration openings.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standardization.

"Multiple" means two or more. "And/or" means "and, or as an alternative". All ranges include endpoints unless otherwise indicated.

Values for characteristics of components (for example, functionality and molecular weight) can be nominal values, meaning values identified by the manufacturer or supplier of the component. Nominal values are expected to correspond to values obtained by any test methods identified herein for determining the same value.

In one aspect, the present invention is a one-component foam (OCF) formulation. One-component foam formulations comprise a prepolymer in combination with a blowing agent and typically a catalyst. An OCF is a single formulation that exists in a non-foamed state that, when dispensed from a pressurized vessel, expands and cures into a polyurethane foam. The prepolymer of the present invention is a reaction product of prepolymer reactants comprising, or consisting of, a polymeric polyol component, a chain extender molecule and a polyisocyanate.

The polymeric polyol component is one or more than one polymeric polyol and is characterized by having an average hydroxyl functionality in a range of 2.3 to 2.85. Measure the average hydroxyl functionality for a polymeric polyol component according to ASTM D4274-11 (method D).

The average hydroxyl functionality $\bar{f}$ for a polymeric polyol component comprising n different polyols for which nominal hydroxyl functionalities are known is represented by equation (1)

$$\bar{f} = \sum_{i=1}^{n} f_i \frac{w_i}{M_i} / \sum_{i=1}^{n} \frac{w_i}{M_i} \qquad (1)$$

where $f_i$ is the hydroxyl functionality of polyol i, $w_i$ is the weight fraction of polyol i and $M_i$ is the number average molecular weight of polyols determined by gel permeation chromatography.

The hydroxyl functionality of the polyols in the polymeric polyol component can be any value provided the average hydroxyl functionality of the entire polymeric polyol component is in a range of 2.3 to 2.85. Desirably, the polymeric polyol component comprises or consists of a combination of diols (hydroxyl functionality of two) and triols (hydroxyl functionality of three).

The polymeric polyol component also has an effective average molecular weight in a range of 4,500 to 10,000 grams per mole. Effective average molecular weight is determined using equation (2):

$$\bar{M} = \sum_{i=1}^{n} w_i M_i / \sum_{i=1}^{n} w_i \qquad (2)$$

$M_i$ is number average molecular weight and $w_i$ is weight fraction of polyol i. Determine number average molecular weights referred to herein using gel permeation chromatography. It is desirable that the polymeric polyol component contain at least one diol having a number average molecular weight in a range of 6,000 to 12,000 grams per mole and preferably more than 50 wt % for the diols, and more preferably each diol in the polymeric polyol component has a number average molecular weight in that range. At the same time, or alternatively, it is desirable for the polymeric polyol component to have at least one triol having a number average molecular weight in a range of 500 to 6000 grams per mole and preferably more than 50 wt % of the triols and even more preferably each triol in the polymeric polyol component has a number average molecular weight in that range.

The concentration of polymeric polyol component is typically 30 wt % or more, preferably 35 wt % or more and can be more preferably 40 wt % or more and while at the same time is typically less than 50 wt %, preferably 45 wt % or less, more preferably 40 wt % and yet more preferably 35 wt % or less relative to total weight of polyols, chain extenders and isocyanates in the OCF formulation. Whether the polymeric polyol component consists of only diols and triols or comprises other polyols, the concentration of triol is desirably five wt % or more and can be 10 wt % or more, 20 wt % or more, and even 30 wt % or more while at the same time is typically less than 40 wt %, preferably less than 35 wt % and can be 34 wt % or less, 33 wt % or less, 32 wt % or less, 31 wt % or less, 30 wt % or less, 25 wt % or less or even 20 wt % or less with wt % relative to combined weight of diols and triols. If the triol concentration is below five wt % then the resulting foam tends to not achieve the low shrinkage requirement sought. Conversely, if the triol concentration is 40 wt % or more then the resulting foam is tends to be undesirably inflexible and excessive foaming pressure can occur making the formulation undesirable for fenestration openings.

The polymeric polyol component provides 40-85 mole-percent of the reactive functionalities relative to total number of reactive functionalities provided by the polymeric polyol component and the chain extender molecule. For this calculation, "reactive functionalities" refers to hydroxyl and amine moieties.

Suitable polymeric polyol components include polyether polyols and polyester polyols. Polyester polyols include those obtainable from conventional synthesis means using polycarboxylic acids and polyfunctional alcohols having from 2 to 12 carbon atoms. Examples of suitable polycarboxylic acids include glutaric acid, succinic acid, adipic acid, sebacic acid, phthalic acid, isophthalic acid, and teraphthalic acid. Examples of suitable polyfunctional alcohols that can be combined with any of these polycarboxylic acids include ethylene glycol, propanediol including propylene glycol, butanediol, and hexanediol.

Polyether polyols include those obtainable using conventional synthesis means by reacting alkylene oxides (such as those selected from a group consisting of ethylene oxide, propylene oxide and butylene oxide) with an initiator having two active hydrogen atoms for a diol and with an initiator having three active hydrogen atoms for a triol and initiators having more than three active hydrogen atoms for polyols with more than three hydroxyl functional groups. Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cylcohexane diol, glycerol, trimethanoyl propane, triethanolamine, sucrose and aromatic based initiators or mixtures thereof. Desirable polyols are those obtainable using propylene oxide or a combination of propylene and ethylene oxide. Once reacted, the polyether polyols are essentially free of monomeric alkylene oxide and initiators and the polyester polyols are essentially free of polycarboxylic acids and polyfunctional alcohols. "Essentially free" means containing less than one wt %, preferably 0.5 wt % or less, more preferably 0.1 wt % or less and can be 0.05 wt % or less and even 0.01 wt % or less or entirely free of the specified component based on total polymeric polyol component weight.

The chain extender molecule can be a single type of molecule or a combination of different molecules. Desirably, the chain extender molecules are selected from a group consisting of oligomers having 3 to 6 carbon atoms and 2 to 4 functional groups selected from hydroxyl and amine moieties. Preferably, the only functional groups on the chain extender are hydroxyl functionalities. In one embodiment, the chain extender can have only hydroxyl functional groups and/or have from 2 to 4 hydroxyl groups. More desirably, the chain extenders are selected from a group consisting of butanediol, pentanediol and glycerol. Chain extenders are low molecular weight oligomers (typically less than 300 gram per mole as determined by gel permeation chromatography). As such, they are distinct from the higher molecular weight polymeric polyol component.

The chain extender molecules are present at a concentration of 0.5 weight-parts or more and can be present at a concentration of one weight-part or more, two weight-parts or more, three weight-parts or more and even four weight-parts or more while at the same time are typically present at a concentration of five weight-parts or less and can be present at a concentration of four weight-parts or less, three weight-parts or less and even two weight-parts or less, with weight-parts based on 100 weight parts of polymeric polyol component.

In one particularly desirable embodiment, the polymeric polyol component consists of a combination of diol and triol, the diol having a number average molecular weight in a range of 6,000 to 12,000 grams per mole, the triol has a molecular weight in a range of 500 to 6000 grams per mole where the triol accounts for five wt % or more and typically 45 wt % or less of the polymeric polyol component and wherein the chain extender molecule is an oligomeric chain extender with a number average molecular weight in a range of 60 to 300 grams per mole and is present at a concentration of 0.5 to 5 weight-parts per 100 weight-parts of diol.

The polymeric isocyanate has a functionality of 2.1 or more and at the same time 3.0 or less. Functionality refers to the average number of reactive groups per molecule. For the polymeric isocyanate, the functionality refers to the moles of —NCO functional groups per mole of isocyanate molecules. When the functionality is below 2.1 the polymeric isocyanate tends to be difficult to handle because it is often a solid at 25° C. and it tends to form dimers. When the functionality is greater than 3.0 the cost is undesirably high and the viscosity tends to be undesirably high. Determine functionality for a polymeric isocyanate according to ASTM D7252-06(2011)e1.

Suitable polymeric isocyanates include aliphatic, cycloaliphatic, aryliphatic and preferably aromatic polyisocyanates. Examples of suitable polymeric isocyanates include alkylene diisocyanates having from 4 to 12 carbon atoms in the alkylene moiety (such as 1,12 dodecane diisocyanate; 2-methylpentamethylene 1,5-diisocyanate; tetramethylene 1,4-diisocyanate; and hexamethylene 1,6-diisocyanate), cycloaliphatic diisocyanates (such as cyclohexane 1,3- and 1,4-diisocyanate; 1-isocyanato-3,3,5-trimethyl-5-isocyanatomethylcyclohexane; 2,4- and 2,6-hexahydrotoluene diisocyanate and the corresponding isomer mixtures; 4,4'-, 2,2'- and 2,4'-dicyclohexylmethane diisocyanate and the corresponding isomer mixtures) and preferably aromatic diisocyanates and polyisocyanates (4,4'-, 2,4'- and 2,2'-diphenylmethane diisocyanates; polymethylene polyphenyl isocyanates; mixtures of 4,4'-, 2,4'- and 2,2'-diphenylmethane diisocyanates; and polymethylene polyphenyl isocyanates (PMDI)).

The polymeric isocyanate is present in the formulation at a concentration sufficient to provide a concentration of unreacted —NCO functional groups in a range of 10 weight-percent (wt %) or more, preferably 12 wt % or more and can be 15 wt % or more while at the same time 20 wt % or less, preferably 18 wt % or less and can be 16 wt % or less based on the total weight of isocyanate and polyol in the formulation. When the concentration of —NCO functional groups is less than 10 wt % the formulation experiences undesirably excessive collapse when frothed to form a foam. When the concentration of —NCO functional groups is greater than 20 wt % the elastic recovery diminishes and can tend to be undesirably low. Determine the concentration of unreacted —NCO functional groups according to ASTM D2572-97 (2010).

The catalyst is desirably an amine catalyst. Suitable amine catalysts include primary, secondary and tertiary amines with tertiary amine catalysts being particularly desirable. Amine catalysts serve to initiate the reaction between hydroxyl or active hydrogens and isocyanate functional groups. Examples of suitable amine catalysts include dimethyl ethanol amine (DMEA), Bis (N,N-dimethyl-3-aminopropyl) amine, N,N-dimethylcyclohexyl amine (CMCHA), tetraethylenediamine and mixtures thereof. Suitable catalysts other than amine catalysts include organometallic compounds such as dibutyltin dimercaptide and dibutyltin carboxylate.

Particularly desirable catalysts are morpholine compounds such as 2,2'-dimorpholinodiethylether (DMDEE), N-ethylmorpholine; N,N-dimethylaminoethyl morpholine; and N,N'-dimorpholinediethyl ether.

Catalysts are desirably present in the OCF formulation at a concentration of at least 5 milliequivalents by weight of nitrogen per gram mole of —NCO functional group (meqN/gmolNCO), preferably 10 or more meqN/gmolNCO or more and more preferably 15 or more meqN/gmolNCO and at the same time is desirably present at a concentration of 100 meqN/gmolNCO or less, preferably 75 meqN/gmolNCO or less and most preferably 50 meqN/gmol NCO or less.

Generally, the pre-polymer is present at a concentration of 60 wt % or more, preferably 65 wt % or more and more preferably 70 wt % or more while at the same time is typically present at a concentration of 90 wt % or less, preferably 85 wt % or less and more preferably 80 wt % or less based on total one-component foam formulation weight.

The OCF formulation further comprises a blowing agent. The blowing agent serves to froth the formulation into a foam when sprayed from a pressurized container. In order to achieve desirable resulting foam densities, blowing agent is typically present at a concentration of 1.5 moles or more, preferably 2 moles or more and can be 2.5 moles or more, 3 moles or more, even 4 moles or more and at the same time is typically 6 moles or less, preferably 5 moles or less, more preferably 4.5 moles or less and can be 4 moles or less, 3 moles or less, even 2 moles or less based one kilogram of OCF formulation without blowing agent. Desirably, the blowing agent is present at a concentration in a range of 10 wt % or more, preferably 12 wt % or more and can be 15 wt % or more while at the same time is generally 20 wt % or less, preferably 18 wt % or less and can be 16 wt % or less relative to overall one-component foam formulation weight.

Suitable blowing agents include those selected from a group consisting of alkanes such as heptane, hexane, n-pentane, iso-pentane, n-butane, iso-butane, propane, cyclohexane, and cyclopentane; ethers such as furan, dimethyl ether, diethyl ether, methylal, and heptafluorodimethyl ether; ketones such as acetone and methyl ethyl ketone; alkyl carboxylates such as methyl formate, dimethyl oxalate and ethyl acetate; and halogenated alkanes such as methylene chloride, difluoromonochloromethane, difluoromethane, 1,1,1,2-tetrafluoroethane, difluoroethanes, 1-chloro-2,2,2,-trifluoroethane, 2,2-dichloro-2-fluoroethane, ethylchloride, dichloroethane, pentafluoropropane, heptafluoropropane; hydrohaloolefin, and trans-1,3,3,3-tetrafluoropropene; as well as carbon dioxide, argon, and nitrogen.

Desirably, the blowing agent comprises or consists of isobutane, propane and dimethyl ether and more desirably comprises or consists of these components at a combined concentration of 10 to 18 wt % relative to the total one-component foam formulation weight.

The OCF formulation can further comprise or be free of any one or any combination of more than one additional additive. Examples of additional additives include surfactants (such as silicone surfactants), flame retardants (such as halogenated and/or phosphorous-containing flame retardants), colorants, and infrared attenuators (such as carbon black, graphite and titanium dioxide). Desirably, the OCF formulation comprises one or both of a silicone surfactant and a flame retardant.

The OCF formulation of the present invention is free of toluene diisocyanate and reaction products of toluene diisocyanate in order to avoid concern with possible health issues associated with toluene diisocyanate.

The OCF formulation of the present invention is useful as a sealant formulation particularly around fenestration openings. The OCF formulation expands and cures into a polyurethane foam with relatively low foaming pressure (generally less than 2.0 kilopascals (kPa), preferably 1.8 kPa or less, more preferably 1.5 kPa or less, yet more preferably 1.3 kPa or less, even more preferably 1.0 kPa or less and can be 0.5 kPa or less while at the same time is generally 0.01 kPa or more, and can be 0.05 kPa or more or 0.1 kPa or more) and at the same time experiences little to no shrinkage over a broad temperature range. That is, the OCF formulation expands and cures in to a polyurethane foam that retains at least 97%, preferably 98% or higher retention, preferably 99% or higher retention, more preferably at least 100% retention and can be greater than 100% retention—corresponding to expansion—of original surface area within 24 hours of application. Generally, the shrinkage is less than 140% retention, preferably 130% or less retention. This shrinkage performance is achievable over a broad range of both temperature (23 degrees Celsius or more, preferably ten degrees Celsius or more and at the same time 40 degrees Celsius or less) and relative humidity (30% or more, preferably 20% or more and at the same time 60% or less, preferably 80% or less and more preferably 100% or less).

This combination of properties makes the formulation particularly desirable for sealing gaps around fenestration openings.

EXAMPLES

Test Methods
Shrinkage.

Characterize foam shrinkage by calculating the change in surface area of a foam bead over 24 hours. Prior to dispensing foam to form the beads, store a can of the formulation at the 21° C. for 24 hours. Spray 5-6 beads that are approximately 13 centimeters long and 1.9 cm wide onto a black cardstock substrate at the designated temperature and humidity. Take a top-down picture of the beads immediately after spraying each bead onto the substrate and take a second picture of each bead 24 hours after spraying them onto the substrate. Use a Cannon Rebel™ T3i camera to capture images of the beads (Canon Rebel is a trademark of Canon Kabushiki Kaisha Corporation). A ruler is on the black cardstock substrate and is used to scale the images prior to analysis. During the spraying and during the following 24 hours maintain the temperature and relative humidity around the foam beads at a set value. Determine the area in pixels of each bead's image in the pictures using a macro written for use with ImageJ software from the National Institutes of Health (NIH). Calculate the ratio of bead area at 24 hours divided by bead area immediately after spraying. Average the ratios for the 5-6 beads and multiply by 100% to obtain a percent area retained after 24 hours.

Characterize the shrinkage for a given sample under three different conditions to evaluate under different climate situations:
  Cold: 10 degrees Celsius (° C.) and 79-82% relative humidity.
  Moderate: 23-24° C. and 54-55% relative humidity
  Hot/Humid: 37-38° C. and 48-51% relative humidity
  Hot/Dry: 38-39° C. and 33-36% relative humidity
A shrinkage value (percent area retained) of greater than 97% is considered acceptable.

Maximum Foaming Pressure.

Determine maximum foaming pressure according the method described in American Architectural Manufacturer's Association (AAMA) method 812-04 using four load cells (Model LCCB-100, output at 3 millivolts per volt at 100 pounds force) and a data collection software program (DA-SYLAB 8.0) that converts the electrical current to pounds force. Cans of formulation are conditioned at the test temperature and humidity for 24 hours prior to testing. Conduct eight runs of the method for each sample and then average the eight values to achieve the maximum foaming pressure. A foaming pressure of less than 2.0 kilopascals (kPa) is considered acceptable while a foaming pressure of 1.5 kPa or less is even more desirable.

Baseline References

For reference purposes, maximum foaming pressure was determined for seven commercially available one component foam formulations. None of the materials achieves a Max Foaming Pressure value below 2.0 kPa. Results are in Table 1.

TABLE 1

| OCF Material | Max Foaming Pressure (kPa) |
| --- | --- |
| FOMO Handi-Foam ™ Window and Door | 27 |
| Convenience Touch 'n Seal ™ No Warp Window and Door | 21 |
| Hilti CF812 Window and Door | 15 |
| Soudal SoudaFoam ™ Door and Window | 6.0 |
| DAP DRAFTSTOP ™ 812 Low Pressure Polyurethane Door & Window Foam | 4.8 |
| OSI QuadFoam ™ Window and Door | 3.0 |
| Selena TYTAN ™ Professional Window and Door | 2.0 |

Handi-Foam is a trademark of ICP Adhesives and Sealants, Inc. DRAFTSTOP is a trademark of DAP Brands Company. QuadFoam is a trademark of Accella Polyurethane Systems LLC. Touch n' Seal is a trademark of Clayton Corporation. SoudaFoam is a trademark of Soudal, naamloze vennootschap Corporation. TYTAN is a trademark of Selena Marketing International.

Experimental Examples and Comparative Examples

Table 2 presents the wt % of each component in the formulations for each Comparative Example (Comp Ex) and each Example (Ex). Characterizations of the resulting formulations are in Table 3. Notably, each Sample formulation has a Polyisocyanurate Functionality of 2.7.

Prepare the OCF formulations of the Comparative Examples (Comp Exs) and Examples (Exs) by first mixing together the B-Side components in a plastic container and then formulating them with the A-Side component within 48 hours. Formulate the B-side and A-side components together in an aerosol can use the following method.

Into an aerosol can weigh the designated amount of A-Side and then B-Side components according to the recipes described below. Include a marble and then crimp the valve to the can using a can crimper to seal the A-Side and B-Side components and marble inside the aerosol can. Add blowing agent into the aerosol can volumetrically via a glass burette fitted with filling and transferring valves. Shake the can for 60 shakes and then store for 10 days prior to characterizing the formulation for Shrinkage and Maximum Foaming Pressure.

The blowing agent for each formulation is a blend of 11 wt % propane, 68 wt % isobutane, up to one wt % n-butane and 20 wt % dimethyl ether, where wt % is relative to total blowing agent weight.

The A-side component for each formulation is PAPI™ 27 Polymeric MDI (PAPI is a trademark of The Dow Chemical Company). PAPI 27 is a polymethylene polyphenylisocyanate that contains methylene diphenyl diisocyanates (MDI) and has an average molecular weight of 340 grams per mole, a functionality of 2.7, an isocyanate equivalent weight of 134.0, viscosity of 150-220 centiPoise at 25° C., density of 1.23 grams per milliliter at 25° C. and —NCO content of 31.4 wt %.

The B-side component consists of a triol, diol, oligomeric chain extender, colorant, surfactant, catalyst and flame retardant with the exception of Comparative Examples A, C, E, G and J which are free of chain extender.

For each sample, the colorant, surfactant, catalyst and flame retardant is the same. The colorant is lemon yellow colorant available as REACTINT™ Yellow X15 (REACTINT is a trademark of Milliken & Company). The surfactant is an organo-silicone surfactant available as NIAX™ Silicon L-5340 surfactant (NIAX is a trademark of Momentive Performance Materials, Inc.). The catalyst is 2,2'-dimorpholinodiethylether available as JEFFCAT™ DMDEE (JEFFCAT is a trademark of JP Morgan Chase Bank). The flame retardant is tris(2-chloroisopropyl) phosphate available as FYROL™ PCF (FYROL is a trademark of ICL-IP America Inc.

The diol, triol and chain extender for each sample are as follows:

| Sample | Diol | Triol | Chain Extender |
|---|---|---|---|
| Example 1 | Diol 1 | Triol 1 | 1,4-Butanediol |
| Example 2 | Diol 1 | Triol 1 | 1,4-Butanediol |
| Example 3 | Diol 1 | Triol 1 | 1,5-Pentanediol |
| Example 4 | Diol 1 | Triol 1 | Glycerol |
| Example 5 | Diol 1 | Triol 1 | 1,4-Butanediol |
| Example 6 | Diol 1 | Triol 1 | 1,4-Butanediol |
| Example 7 | Diol 1 | Triol 1 | 1,4-Butanediol |
| Example 8 | Diol 1 | Triol 1 | 1,4-Butanediol |
| Example 9 | Diol 1 | Triol 1 | 1,4-Butanediol |
| Comparative Example A | Diol 1 | Triol 1 | (None) |
| Comparative Example B | Diol 2 | Triol 1 | 1,4-Butanediol |
| Comparative Example C | Diol 3 | Triol 1 and Triol 2 | (None) |
| Comparative Example D | Diol 3 | Triol 1 and Triol 2 | 1,4-Butanediol |
| Comparative Example E | | Triol 1 and Triol 2 | (None) |
| Comparative Example F | | Triol 1 and Triol 2 | 1,4-Butanediol 1 |
| Comparative Example G | Diol 1 | Triol 1 | (None) |
| Comparative Example H | Diol 1 | Triol 1 | 1,4-Butanediol |
| Comparative Example I | Diol 1 | Triol 2 | 1,4-butanediol |
| Comparative Example J | Diol 1 | Triol 2 | (None) |
| Comparative Example K | Diol 1 | Triol 1 | 1,4-Butanediol |

Diol 1 is polypropylene oxide polyol with a nominal functionality of 2.0 and a hydroxyl equivalent weight of approximately 4000.
Diol 2 is polypropylene oxide polyol with a nominal functionality of 2.0 and a hydroxyl equivalent weight of approximately 2000.
Diol 3 is polypropylene oxide polyol with a nominal functionality of 2.0 and a hydroxyl equivalent weight of approximately 500.
Triol 1 is glycerine propoxylated polyether triol having a nominal functionality of three and a hydroxyl equivalent weight of approximately 360.
Triol 2 is glycerine propoxylated polyether triol having a nominal functionality of three and a hydroxyl equivalent weight of approximately 1800.

A desirable OCF formulation results in a maximum foaming pressure of less than 2.0 kilopascals according to the max foaming pressure test described above and produces a foam that retains at least 97%, preferably at least 98% of its original surface area within 24 hours of application as determined by the Shrinkage test described above.

Comp Exs A, C, E, G and J reveal the need for the chain extender in order to achieve the desirable OCF formulation.

Comp Exs B, C and D reveal that when the average molecular weight of the polyol is too low, the maximum foaming pressure is undesirably high.

Comp Exs F, G and H reveal that when the polyol average hydroxyl functionality is too high then the maximum foaming pressure is also undesirably high.

Comp Exs I and J reveal that when the average hydroxyl functionality is too low then the shrinkage is undesirably high.

Exs 1-9 reveal that when the OCF formulation is within the presently claimed characteristics then a desirable OCF formulation results.

TABLE 2

| | | B-Side Component Composition (wt % of total B-Side Composition weight) | | | | | | | Formulation Composition (wt % of Formulation Weight) | | |
|---|---|---|---|---|---|---|---|---|---|---|---|
| Sample | % Triol | Triol | Diol | Chain Extender | Colorant | Surfactant | Catalyst | Flame Retardant | A-Side | B-Side | Blowing Agent |
| Ex 1 | 20 | 14.7 | 58.9 | 1.50 | 0.26 | 4.6 | 2.9 | 17.2 | 43.9 | 43.1 | 13.0 |
| Ex 2 | 20 | 14.5 | 58.0 | 2.24 | 0.26 | 4.7 | 2.9 | 17.5 | 44.6 | 42.4 | 13.0 |
| Ex 3 | 20 | 14.8 | 59.4 | 3.09 | 0.25 | 4.4 | 1.6 | 16.5 | 41.8 | 45.2 | 13.0 |

TABLE 2-continued

| | | B-Side Component Composition (wt % of total B-Side Composition weight) | | | | | | | Formulation Composition (wt % of Formulation Weight) | | |
|---|---|---|---|---|---|---|---|---|---|---|---|
| Sample | % Triol | Triol | Diol | Chain Extender | Colorant | Surfactant | Catalyst | Flame Retardant | A-Side | B-Side | Blowing Agent |
| Ex 4 | 20 | 15.5 | 61.9 | 0.78 | 0.24 | 4.2 | 1.5 | 15.9 | 40.1 | 46.9 | 13.0 |
| Ex 5 | 25 | 19.1 | 57.3 | 0.77 | 0.24 | 4.3 | 2.1 | 16.2 | 40.7 | 45.7 | 13.7 |
| Ex 6 | 25 | 19.0 | 56.9 | 1.15 | 0.25 | 4.3 | 2.2 | 16.3 | 41.1 | 45.2 | 13.7 |
| Ex 7 | 30 | 22.2 | 51.9 | 1.13 | 0.26 | 4.7 | 2.4 | 17.5 | 43.8 | 41.9 | 14.3 |
| Ex 8 | 30 | 21.9 | 51.1 | 1.49 | 0.26 | 4.7 | 3.0 | 17.6 | 44.1 | 41.6 | 14.3 |
| Ex 9 | 10 | 7.8 | 70.3 | 0.79 | 0.23 | 4.1 | 1.4 | 15.3 | 38.4 | 48.6 | 13.0 |
| Comp Ex A | 20 | 16.0 | 63.5 | 0 | 0.22 | 4.0 | 1.4 | 15.0 | 37.2 | 49.8 | 13.0 |
| Comp Ex B | 20 | 15.5 | 61.8 | 0.78 | 0.24 | 4.3 | 1.5 | 16.0 | 40.4 | 46.6 | 13.0 |
| Comp Ex C | 86 | 64.8 | 10.5 | 0 | 0.27 | 4.3 | 2.1 | 18.1 | 45.5 | 41.4 | 13.2 |
| Comp Ex D | 86 | 63.8 | 10.4 | 0.75 | 0.27 | 4.3 | 2.1 | 18.4 | 46.0 | 40.8 | 13.2 |
| Comp Ex E | 100 | 79.4 | 0 | 0 | 0.23 | 4.0 | 1.4 | 15.0 | 39.4 | 47.3 | 13.2 |
| Comp Ex F | 100 | 77.3 | 0 | 0.78 | 0.24 | 4.3 | 1.5 | 16.0 | 40.2 | 46.6 | 13.2 |
| Comp Ex G | 50 | 38.7 | 38.7 | 0 | 0.25 | 4.4 | 1.56 | 16.5 | 41.7 | 45.3 | 13.0 |
| Comp Ex H | 50 | 37.5 | 37.5 | 1.53 | 0.26 | 4.5 | 1.6 | 17.1 | 43.3 | 43.7 | 13.0 |
| Comp Ex I | 20 | 15.6 | 62.3 | 1.19 | 0.23 | 4.0 | 1.4 | 15.2 | 37.9 | 49.1 | 13.0 |
| Comp Ex J | 20 | 15.9 | 63.8 | 0 | 0.22 | 3.9 | 1.4 | 14.8 | 36.5 | 50.5 | 13.0 |
| Comp Ex K | 35 | 26.5 | 49.2 | 1.55 | 0.25 | 4.4 | 1.6 | 16.5 | 41.9 | 45.1 | 13.0 |

TABLE 3

| | Shrinkage (% original area) | | | | Foaming Pressure | Polyol Hydroxyl | Polyol Effective Ave Mol Wt | Chain | Mol % of Reactive Groups from | Unreacted —NCO Functional Groups |
|---|---|---|---|---|---|---|---|---|---|---|
| Sample | Cold$^a$ | Moderate$^b$ | Hot/Humid$^c$ | Hot/Dry$^d$ | (kPa) | Functionality | (g/mol) | Extender | Polyol | (wt %) |
| Comp Ex A* | 100 | 98 | 93 | 96 | 0.77 | 2.65 | 6610 | (None) | 100 | 13.2 |
| Comp Ex A'* | 99 | 97 | 93 | 94 | 0.89 | 0.89 | 6610 | (None) | 100 | 13.2 |
| Ex 1 | 115 | 116 | 115 | 111 | 0.81 | 2.65 | 6620 | Butanediol | 63 | 15.5 |
| Ex 2 | 110 | 121 | 114 | 118 | 0.17 | 2.65 | 6620 | Butanediol | 52 | 15.5 |
| Ex 3 | 93 | 106 | 107 | 110 | 0.15 | 2.65 | 6620 | Pentanediol | 49 | 13.8 |
| Ex 4 | 97 | 104 | 106 | 109 | 0.21 | 2.65 | 6620 | Glycerol | 70 | 13.8 |
| Ex 5 | 107 | 115 | 102 | 110 | 0.72 | 2.71 | 6270 | Butanediol | 80 | 14.3 |
| Ex 6 | 110 | 117 | 106 | 118 | 0.92 | 2.71 | 6270 | Butanediol | 72 | 14.3 |
| Ex 7 | 114 | 120 | 109 | 112 | 0.85 | 2.76 | 5920 | Butanediol | 75 | 15.5 |
| Ex 8 | 117 | 129 | 115 | 120 | 0.78 | 2.76 | 5920 | Butanediol | 69 | 15.5 |
| Ex 9 | 100 | 106 | 105 | 100 | 0.33 | 2.45 | 7310 | Butanediol | 69 | 13.8 |
| Comp Ex B | 91 | 87 | 83 | 78 | 4.94 | 2.48 | 3420 | Butanediol | 81 | 13.8 |
| Comp Ex C | 125 | 111 | 114 | 102 | 26.9 | 2.81 | 2340 | (None) | 100 | 14.7 |
| Comp Ex D | 139 | 113 | 129 | 115 | 35.2 | 2.81 | 2340 | Butanediol | 89 | 14.6 |
| Comp Ex E | 93 | 85 | 82 | 82 | 1.15 | 3.00 | 5000 | (None) | 100 | 13.7 |
| Comp Ex F | 97 | 90 | 92 | 86 | 2.97 | 3.00 | 5000 | Butanediol | 81 | 13.7 |
| Comp Ex G | 117 | 103 | 113 | 98 | 15.1 | 2.88 | 4540 | (None) | 100 | 13.8 |
| Comp Ex H | 135 | 117 | 119 | 120 | 5.26 | 2.88 | 4540 | Butanediol | 77 | 13.8 |
| Comp Ex I | 82 | 86 | 91 | 99 | 0.02 | 2.25 | 7600 | Butanediol | 47 | 13.8 |
| Comp Ex J | 80 | 79 | 76 | 80 | 0.04 | 2.25 | 7600 | (None) | 100 | 13.8 |
| Comp Ex K | 108 | 115 | 113 | 117 | 2.41 | 2.80 | 5580 | Butanediol | 71 | 13.8 |

*Comp Ex A and Comp Ex A' are the same formulation but prepared at two different times as separate formulations.
$^a$Cold (10° C. and 79-82% RH).
$^b$Moderate (23-24° C. and 54-55% RH).
$^c$Hot/Humid (37-38° C. and 48-51% RH).
$^d$Hot/Dry (38-39° C., 33-36% RH).

The invention claimed is:

1. A one-component foam formulation comprising a prepolymer, a blowing agent and, optionally, additional additives wherein the prepolymer is a reaction product of prepolymer reactants comprising:
    (a) a polymeric polyol component that comprises a blend of at least one diol and at least one triol, the polymeric polyol component having an average hydroxyl functionalities in a range of 2.45 to 2.85 hydroxyl functionalities per molecule as determined using ASTM D4274-11, method D; and where the polymeric polyol component has an effective average molecular weight $\overline{M}$ in a range of 4,500 to 10,000 grams per mole as calculated according to equation (2):

$$\overline{M} = \Sigma_{i=1}^{n} w_i M_i / \Sigma_{i=1}^{n} w_i \quad (2)$$

(b) one or more than one type of chain extender molecule having 3 to 6 carbon atoms and 2 to 4 hydroxyl functionalities per molecule;
    (c) a polyisocyanate with a functionality in a range of 2.1 to 3.0 —NCO functionalities per molecule as determined by ASTM D7252-06(2011)e1; and
    (d) a catalyst;

where the one-component foam formulation is free of toluene diisocyanate and reaction products of toluene diisocyanate and wherein the polymeric polyol component (a) provides 40-85 mole-percent of the hydroxyl functionalities relative to the total hydroxyl functionalities provided by the polymeric polyol component (a) and said one or more than one type of chain extender molecule (b) and wherein the polyisocyanate is present at a concentration relative to the polymeric polyol component and said one or more than one type of chain extender molecule such that there is an average of 12-20 weight-percent unreacted —NCO functional groups in the prepolymer based on the total weight of isocyanate, polymeric polyol component and said one or more than one type of chain extender molecule in the formulation as determined by ASTM D2572-97 (2010), and wherein the formulation has a foaming pressure of less than 2.0 kilopascals and expands and cures into a polyurethane foam that retains at least 97% to 140% of its original surface area within 24 hours of application to a substrate.

2. The one-component foam formulation of claim 1, wherein the polymeric polyol component is a blend consisting of the at least one diol and the at least one triol.

3. The one-component foam formulation of claim 2, wherein the at least one diol has a number average molecular weight in a range of 6000 to 12,000 grams per mole and the at least one triol has a number average molecular weight in a range of 500 to 6000 grams per mole where number average molecular weight is determined gel permeation chromatography.

4. The one-component foam formulation of claim 2, wherein the at least one triol is present at a concentration in a range of five to less than 35 weight-percent based on total weight of the at least one diol and the at least one triol.

5. The one-component foam formulation of claim 1, wherein the one or more than one type of chain extender molecule is present at a concentration of 0.5 to five weight-parts per 100 weight parts of polymeric polyol component (a).

6. The one-component foam formulation of claim 1, wherein all of the functionalities of the one or more than one type of chain extender molecule are hydroxyls.

7. The one-component foam formulation of claim 1, wherein the one or more than one type of chain extender molecule are selected from a group consisting of butanediol, pentanediol and glycerol.

8. The one-component foam formulation of claim 1, wherein the blowing agent is present at a concentration in a range of 10 to 18 weight-percent relative to the total weight of the one-component foam formulation.

9. The one-component foam formulation of claim 1, wherein the catalyst is 2,2'-dimorpholinodiethylether.

10. The one-component foam formulation of claim 1, wherein the one-component foam formulation further comprises a silicone surfactant.

11. The one-component foam formulation of claim 1, wherein the one-component foam formulation further comprises a flame retardant.

* * * * *